June 16, 1925.  1,541,906
E. DELACUVELLERIE
FURNACE FOR USE IN THE MANUFACTURE OF SHEET GLASS BY VERTICAL DRAWING
Filed April 16, 1923
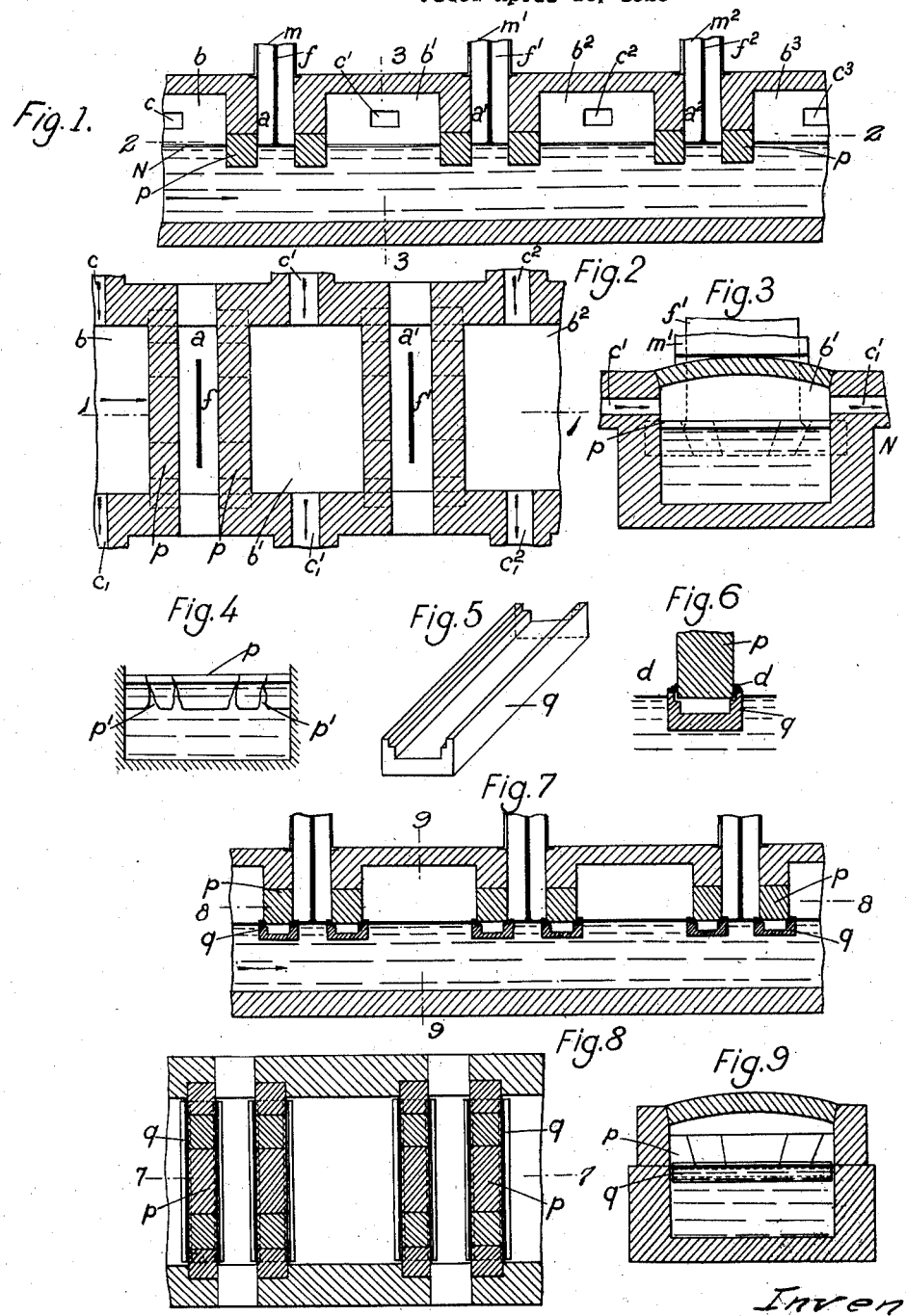
Inventor
E. Delacuvellerie Patented June 16, 1925.

1,541,906

UNITED STATES PATENT OFFICE.

ERNEST DELACUVELLERIE, OF DAMPREMY, BELGIUM, ASSIGNOR TO SOCIÉTÉ ANONYME "BREVETS FOURCAULT," OF DAMPREMY, BELGIUM, A CORPORATION OF BELGIUM.

FURNACE FOR USE IN THE MANUFACTURE OF SHEET GLASS BY VERTICAL DRAWING.

Application filed April 16, 1923. Serial No. 632,500.

*To all whom it may concern:*

Be it known that I, ERNEST DELACUVELLERIE, subject of the King of Belgium, residing at Dampremy, in Belgium, have invented certain new and useful Improvements in or Relating to Furnaces for Use in the Manufacture of Sheet Glass by Vertical Drawing; and I do hereby declare the following to be a full, clear, and exact description of the invention, such as will enable others skilled in the art to which it appertains to make and use the same.

The present invention relates to furnaces constructed for the manufacture by vertical drawing of sheet glass and it has for its object to obtain the said glass sheets without any of the usual defects which are due to lack of physical homogenity of the hot glass. The accompanying Figures 1 to 9 comprise two groups, the first group, namely, Figures 1 to 4, refer to furnaces such as usually constructed. The second group, namely, Figures 5 to 9 refer to the improved form of furnaces in accordance with the present invention. In these figures:

Figure 1 is a sectional elevation on the line 1—1, Figure 2.

Figure 2 is a sectional plan on the line 2—2, Figure 1.

Figure 3 is a cross section on the line 3—3, Figure 1.

Figure 4 is a section of a corroded or worn bridge piece.

Figure 5 is a perspective view of an under or lower bridge piece which is an essential characteristic of the present invention.

Figure 6 is a transverse section of an under or lower bridge piece in position.

Figure 7 is a sectional elevation on the line 7—7, Figure 8, the under or lower bridge pieces being shewn in position.

Figure 8 is a sectional plan on the line 8—8, Figure 7.

Figure 9 is a cross section on the line 9—9, Figure 7.

In order that the invention may be readily understood it is considered desirable to indicate briefly how the usual furnaces are constructed. In Figures 1 to 4, it is usual to provide working spaces in which drawing is effected by cutting the surface of the glass transversely to the passage enclosing this glass by fixed bridge pieces $p$ of refractory material which are more or less deeply immersed in the tank of glass. The working spaces $a$, $a^1$, $a^2$, are thus provided between two of these bridge pieces $p$ above which are placed the drawing machines $m$, $m^1$, $m^2$. The liquid glass coming from the melting furnace must therefore pass under these bridges in order that it may be taken up by the drawing machines. This system provides therefore hermetical seals for the working or drawing spaces from the intermediate chambers $b$, $b^1$, $b^2$ of the furnace proper. This system is not without inconvenience. In fact, the bridges under consideration can only be positioned or set in place when the furnace is closed down and they cannot be constructed in one piece; it follows therefore that the various parts or keystones of which they are composed ought to be assumably in the form of a flat roof having joints which are arranged more or less vertically.

Now, at the end of a short time under the corrosive and dissolving action of the glass, these joints become enlarged and assume an aspect somewhat as indicated in Figure at 4 at $p^1$. This causes the formation of passages for the liquid glass which are injurious to the efficiency of the manufacture. Instead of obtaining a uniform layer of glass passing under the bridge at a constant distance from the surface, this uniform layer of glass is broken up by currents of liquid glass which currents pass through the joints of the bridge at a higher level.

This fact injuriously affects the thermal and chemical homogenity of the layer of glass and imparts a false ring to the quality of the glass sheets obtained. The thermal homogenity is affected because the temperature of the glass at different levels from the surface diminishes gradually downwardly. The glass which passes through the joints is therefore hotter than that which passes under the middle of the keystones.

The chemical homogenity is affected because the joint being narrow, the glass which passes therethrough is in contact with a relatively large surface of refractory material. It dissolves a larger portion of this refractory material than the glass which normally passes under the middle part of the bridge. The irregular corrosion of the bridges is facilitated by the fact that the technique of refractory products necessitates the formation of keystones of a relatively homogeneous mixture so as to allow of their being subjected without rupture to the second heating which they undergo on lighting the furnace. (The first heating being effected at the moment of preliminary burning).

The defects inherent in the glass sheets by reason of the causes enumerated above manifest themselves in the formation of striations or cords, a phenomenon which is well known in the art.

The improvement forming the subject matter of the present invention avoid these inconveniences.

The new construction in accordance with the invention always comprises a bridge piece $p$, Figures 7, 8 and 9, constructed as hereinbefore described, but instead of being immersed for a considerable depth in the molten glass, its arch is immersed for only a few centimeters under the level of the glass. Further, a special piece $q$, hereinafter referred to as an under or lower bridge piece, Figures 5 and 6, which is composed of very homogeneous and fine grained refractory material, is held in reserve and is baked at the moment when it is desired to use it. It is then immersed in the glass without undergoing cooling and slid under the bridge pieces.

The length of this under or lower bridge piece is practically equal to the free length of the bridge piece $p$ proper. Its width is equal to or greater than the width of the bridge piece $p$ and its height is determined by the necessities of the manufacture. Its section, Figure 6, is practically of channel form. The section may, however, be of any other desired form.

This under or lower bridge being placed in position entirely under the surface of the liquid glass, it is therefore subjected to a strong upward thrust exerted by the glass in the attempt to force the bridge pieces to a proper level. This upward thrust is sufficient to maintain the under or lower bridge piece in place. The use of the under or lower bridge piece completely eliminates the defects enumerated above against the bridge pieces $p$ as will be quite readily understood.

In fact (1) The under or lower bridge piece being in one piece it would be without vertical joints which cannot be avoided in the construction of the bridge pieces $p$ properly so called.

(2) From this fact the layer of glass will pass under this under or lower bridge piece throughout its entire length and at the same depth below the level of the glass.

(3) The usual bridge pieces can be repaired in case of deterioration only on closing down of the furnace, whereas the under or lower bridge pieces can be replaced when the furnace is hot with the greatest facility when such is deemed necessary and without having to stop the working of the furnace.

(4) As these under or lower bridge pieces do not require to be cooled after baking or burning and not requiring reheating before their introduction into the furnace, they are placed immediately in the latter on withdrawal from the baking furnace. They can therefore be manufactured by means of very homogeneous refractory material which are less subject to corrosion and therefore impart to the glass only an inappreciable quantity of alumina. The corrosion, however, being quite regular, injures the whole layer of glass and produces therefore no homogeneous alteration, this point being of considerable importance for satisfactory manufacture.

Figure 8 shews the section of a bridge under which is slid an under or lower bridge piece, the latter being indicated in perspective in Figure 5.

It is evident that these under or lower bridge pieces, which are shewn in the drawings of channel formation as above stated may be of any other desired section. The under or lower bridge can be constructed in such manner as to avoid the defects arising from the fall on the glass of refractory particles which become detached from the bridge pieces in those cases where disintegration takes place under the influence of the heat.

To avoid this to a greater or less extent the under or lower bridge piece may be slightly wider than the bridge piece itself as indicated in Figure 6.

The result of this arrangement is that the said particles of refractory material fall on the marginal edges of the under or lower bridge pieces adjacent the bridge pieces as at $d$, Figure 6, and remain there.

The purity of the glass surface will therefore be preserved from any contamination in this case.

Claim.

An improvement in furnaces for use in the manufacture of glass sheets by vertical drawing and consisting essentially in the addition of a homogeneous piece of refractory material of suitable section which is placed directly under the bridge pieces proper which exist in this type of furnace, the injurious corrosion of the joints of the usual bridge pieces being avoided and the particles or grains which become detached from the walls collecting on the said under additional pieces, the replacement of which additonal pieces being effected without complete stoppage of the furnace and their protection assures perfect manufacture of the glass sheet without striations or cords.

In testimony whereof I have signed my name to this specification.

ERNEST DELACUVELLERIE.